United States Patent
Rezayee et al.

(10) Patent No.: US 10,496,975 B2
(45) Date of Patent: Dec. 3, 2019

(54) POINT OF SALE SYSTEM WITH SECURE AND UNSECURE MODES

(71) Applicant: Square, Inc., San Francisco, CA (US)

(72) Inventors: Afshin Rezayee, Richmond Hill (CA); Malcolm Ronald Smith, Toronto (CA); Kshitiz Vadera, Toronto (CA); Kevin Ka Wai Ng, Markham (CA); Haipeng Yan, Whitby (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/752,698

(22) Filed: Jun. 26, 2015

(65) Prior Publication Data
US 2016/0026990 A1  Jan. 28, 2016

Related U.S. Application Data (60) Provisional application No. 62/027,855, filed on Jul. 23, 2014.

(51) Int. Cl.
*G06Q 20/20* (2012.01)
*G06F 3/0482* (2013.01)
(Continued)

(52) U.S. Cl.
CPC ......... *G06Q 20/206* (2013.01); *G06F 3/0482* (2013.01); *G06F 3/04842* (2013.01);
(Continued)

(58) Field of Classification Search
CPC .... G06Q 20/206; G06Q 20/20; G06Q 20/204; G06Q 20/327; G06Q 20/401; G06Q 20/405; G06F 3/0482; G06F 3/04842
(Continued)

(56) References Cited

U.S. PATENT DOCUMENTS

| | | |
|---|---|---|
| 4,304,385 A | 12/1981 | Farouche et al. |
| 5,331,138 A | 7/1994 | Saroya |

(Continued)

FOREIGN PATENT DOCUMENTS

| | | |
|---|---|---|
| AU | 2015349752 B2 | 7/2017 |
| CA | 2 955 454 A1 | 1/2016 |

(Continued)

OTHER PUBLICATIONS

IEEE Dictionary, p. 247, 2007, (IA/PE/PSE) 1100-1999, 599-1985w, definition of 'coupling' provided withing text of Office Action.*

(Continued)

*Primary Examiner* — James D Nigh
*Assistant Examiner* — Margaret M Neubig
(74) *Attorney, Agent, or Firm* — Maynard, Cooper & Gale, P.C.; Brian T. Sattizahn (57) ABSTRACT

A point of sale system has a display for receiving touch inputs, a controller to receive the touch inputs from the display, and a secure controller to receive touch input data from the controller. The system also has a card interface module and a contactless interface module to provide encrypted data to the secure controller. The secure controller can operate in either a secure mode or a non-secure mode. When a non-secure mode is engaged, the secure controller provides the touch input data to a processor. When a secure mode is engaged, the secure controller blocks at least a portion of the touch input data from the processor.

9 Claims, 8 Drawing Sheets

(51) Int. Cl.
*G06F 3/0484* (2013.01)
*G06Q 20/32* (2012.01)
*G06Q 20/40* (2012.01)

(52) U.S. Cl.
CPC ........... *G06Q 20/20* (2013.01); *G06Q 20/204* (2013.01); *G06Q 20/327* (2013.01); *G06Q 20/401* (2013.01); *G06Q 20/405* (2013.01)

(58) Field of Classification Search
USPC .................................................... 705/50–79
See application file for complete search history.

(56) References Cited

U.S. PATENT DOCUMENTS

| | | | |
|---|---|---|---|
| 5,494,136 | A | 2/1996 | Humble |
| 5,970,146 | A * | 10/1999 | McCall ................. G06F 3/0416 345/173 |
| 6,062,477 | A | 5/2000 | Wike, Jr. et al. |
| 6,098,888 | A | 8/2000 | Praden |
| 6,157,966 | A | 12/2000 | Montgomery et al. |
| 6,766,994 | B2 | 7/2004 | Serbinski et al. |
| 7,004,385 | B1 | 2/2006 | Douglass |
| 7,048,184 | B2 | 5/2006 | Persky |
| 7,597,250 | B2 | 10/2009 | Finn |
| 7,866,546 | B1 | 1/2011 | Vance |
| 8,261,064 | B2 * | 9/2012 | Ditzman ................. G06F 21/83 178/18.01 |
| 8,558,685 | B2 | 10/2013 | Long et al. |
| 8,768,838 | B1 | 7/2014 | Hoffman |
| 8,788,428 | B2 * | 7/2014 | Weston ................. G06F 21/554 705/73 |
| 8,944,322 | B2 | 2/2015 | White |
| 9,047,639 | B1 | 6/2015 | Quintiliani et al. |
| 9,092,766 | B1 | 7/2015 | Bedier et al. |
| 9,129,274 | B1 | 9/2015 | Mocko et al. |
| 9,257,018 | B2 | 2/2016 | Edwards et al. |
| 9,286,494 | B1 | 3/2016 | Lamfalusi et al. |
| 9,589,428 | B2 | 3/2017 | Edwards et al. |
| 9,741,211 | B2 | 8/2017 | Skiles |
| 9,881,288 | B1 | 1/2018 | Bell et al. |
| 9,911,266 | B2 | 3/2018 | Weston et al. |
| 9,916,570 | B2 | 3/2018 | Edwards et al. |
| 9,946,506 | B2 | 4/2018 | Ting et al. |
| 9,965,116 | B1 | 5/2018 | Wolter |
| 2002/0082993 | A1 | 6/2002 | Hoyos et al. |
| 2002/0166891 | A1 | 11/2002 | Stoutenburg et al. |
| 2003/0004876 | A1 | 1/2003 | Jacobson |
| 2003/0066893 | A1 | 4/2003 | Yap et al. |
| 2003/0135406 | A1 | 7/2003 | Rowe |
| 2003/0135751 | A1 * | 7/2003 | O'Donnell ............. G06Q 20/00 705/16 |
| 2003/0191713 | A1 | 10/2003 | Yap et al. |
| 2004/0043650 | A1 | 3/2004 | Yang et al. |
| 2005/0039052 | A1 | 2/2005 | O'Donnell et al. |
| 2005/0283403 | A1 | 12/2005 | Ramirez et al. |
| 2006/0168663 | A1 | 7/2006 | Vijloen et al. |
| 2006/0226224 | A1 | 10/2006 | Henry |
| 2006/0242696 | A1 | 10/2006 | Cruzado et al. |
| 2007/0251997 | A1 | 11/2007 | Brown et al. |
| 2007/0257110 | A1 | 11/2007 | Schmidt et al. |
| 2009/0006262 | A1 | 1/2009 | Brown et al. |
| 2009/0102813 | A1 * | 4/2009 | Mamba .................... G06F 3/044 345/174 |
| 2009/0119221 | A1 | 5/2009 | Weston et al. |
| 2009/0173790 | A1 | 7/2009 | Hart et al. |
| 2009/0222383 | A1 | 9/2009 | Tato et al. |
| 2009/0307142 | A1 | 12/2009 | Mardikar |
| 2010/0057620 | A1 | 3/2010 | Li et al. |
| 2010/0211469 | A1 | 8/2010 | Salmon et al. |
| 2010/0262504 | A1 | 10/2010 | Tamura |
| 2011/0176004 | A1 | 7/2011 | Chaussade |
| 2011/0199308 | A1 * | 8/2011 | Nativel ................. G06F 21/606 345/168 |
| 2012/0023026 | A1 | 1/2012 | Chen et al. |
| 2012/0066079 | A1 | 3/2012 | Falzone et al. |
| 2012/0197744 | A1 | 8/2012 | Rose et al. |
| 2012/0242526 | A1 | 9/2012 | Perez et al. |
| 2012/0254038 | A1 | 10/2012 | Mullen |
| 2012/0290420 | A1 | 11/2012 | Close |
| 2013/0006847 | A1 | 1/2013 | Hammad et al. |
| 2013/0050084 | A1 | 2/2013 | Soffer |
| 2013/0144731 | A1 | 6/2013 | Baldwin et al. |
| 2013/0153656 | A1 | 6/2013 | Skiles |
| 2013/0155595 | A1 | 6/2013 | Herring et al. |
| 2013/0198086 | A1 | 8/2013 | Mardikar |
| 2013/0246171 | A1 * | 9/2013 | Carapelli ........... G06Q 20/3278 705/14.51 |
| 2013/0299574 | A1 | 11/2013 | Theobald |
| 2014/0022211 | A1 | 1/2014 | Karpin et al. |
| 2014/0047390 | A1 | 2/2014 | Thorsander et al. |
| 2014/0071043 | A1 | 3/2014 | Jung et al. |
| 2014/0089174 | A1 | 3/2014 | Carapelli et al. |
| 2014/0095387 | A1 | 4/2014 | Colnot |
| 2014/0096222 | A1 * | 4/2014 | Colnot .................... G06F 21/31 726/9 |
| 2014/0097249 | A1 * | 4/2014 | Gomez .................. G06Q 20/00 235/440 |
| 2014/0101035 | A1 | 4/2014 | Tanner et al. |
| 2014/0172607 | A1 | 6/2014 | Skiles |
| 2014/0214688 | A1 * | 7/2014 | Weiner ............... G06Q 20/3227 705/71 |
| 2014/0252089 | A1 | 9/2014 | Bostwick |
| 2014/0256251 | A1 * | 9/2014 | Caceres ............... H04B 5/0031 455/41.1 |
| 2014/0283857 | A1 | 9/2014 | Liu |
| 2015/0095134 | A1 | 4/2015 | Parker et al. |
| 2015/0095241 | A1 | 4/2015 | Edwards |
| 2015/0100498 | A1 | 4/2015 | Edwards |
| 2015/0199882 | A1 | 7/2015 | Fernando et al. |
| 2015/0261314 | A1 | 9/2015 | Herring et al. |
| 2015/0363757 | A1 | 12/2015 | Mocko et al. |
| 2016/0005020 | A1 | 1/2016 | Fernando et al. |
| 2016/0012465 | A1 | 1/2016 | Sharp |
| 2016/0051067 | A1 | 2/2016 | Law et al. |
| 2016/0070964 | A1 | 3/2016 | Conrad |
| 2016/0117529 | A1 | 4/2016 | Bedier et al. |
| 2016/0117659 | A1 | 4/2016 | Bedier et al. |
| 2016/0117662 | A1 | 4/2016 | Bedier et al. |
| 2016/0124627 | A1 | 5/2016 | Beatty et al. |
| 2016/0148023 | A1 | 5/2016 | Lamfalusi et al. |
| 2017/0154334 | A1 | 6/2017 | Lewis et al. |
| 2017/0221035 | A1 | 8/2017 | Edwards et al. |
| 2017/0308882 | A1 | 10/2017 | Bedier et al. |
| 2017/0311737 | A1 | 11/2017 | Law et al. |
| 2017/0364888 | A1 | 12/2017 | Bell et al. |
| 2018/0039965 | A1 | 2/2018 | Han et al. |
| 2018/0150818 | A1 | 5/2018 | Mocko et al. |
| 2018/0174013 | A1 | 6/2018 | Lee |
| 2018/0174391 | A1 | 6/2018 | Weston et al. |

FOREIGN PATENT DOCUMENTS

| | | |
|---|---|---|
| CN | 106716470 A1 | 5/2017 |
| WO | 2011/051757 A1 | 5/2011 |
| WO | 2012/078990 A1 | 6/2012 |
| WO | 2015/001468 A1 | 1/2015 |
| WO | 2016/014346 A1 | 1/2016 |

OTHER PUBLICATIONS

Authoritative Dictionary of IEEE Standards Terms, 7th Edition, available at https://ieeexplore.ieee.org/document/4116787 (Year: 2000).*
Maxim Integrated, "Application Note 4809: Designing Next-Generation Payment Terminals That Meet PCI PTS 3.x Requirements", attached as PDF file, downloaded from https://www.maximintegrated.com/en/app-notes/index.mvp/id/4809, dated May 19, 2011 (Year: 2011).*
International Search Report and Written Opinion for International Application No. PCT/US15/40819, dated Oct. 13, 2015.
Extended European Search Report for European Patent Application No. 15825575.2, dated Nov. 28, 2017.

(56) References Cited

OTHER PUBLICATIONS

Non-Final Office Action dated May 21, 2015, for U.S. Appl. No. 14/592,102, of Chen, Y., et al., filed Jan. 8, 2015.
Final Office Action dated Dec. 9, 2015, for U.S. Appl. No. 14/592,102, of Chen, Y., et al., filed Jan. 8, 2015.
Non-Final Office Action dated Apr. 12, 2016, for U.S. Appl. No. 14/982,840, of Edwards, T., et al., filed Dec. 29, 2015.
Non-Final Office Action dated Jul. 20, 2016, for U.S. Appl. No. 14/848,123, of Guise, M., et al., filed Sep. 8, 2015.
Notice of Allowance dated Oct. 24, 2016, for U.S. Appl. No. 14/982,840, of Edwards, T., et al., filed Dec. 29, 2015.
Final Office Action dated Jan. 27, 2017, for U.S. Appl. No. 14/848,123, of Guise, M., et al., filed Sep. 8, 2015.
Non-Final Office Action dated Mar. 31, 2017, for U.S. Appl. No. 15/241,901, of Edwards, T., et al., filed Aug. 19, 2016.
Notice of Acceptance for Australian Patent Application No. 2015349752, dated Jul. 3, 2017.
Notice of Allowance dated Oct. 30, 2017, for U.S. Appl. No. 15/241,901, of Edwards, T., et al., filed Aug. 19, 2016.
Non-Final Office Action dated Feb. 20, 2018, for U.S. Appl. No. 15/793,187, of Mocko, C.L., et al., filed Oct. 25, 2017.
Notice of Allowance dated Jun. 18, 2018, for U.S. Appl. No. 15/793,187, of Mocko, C.L., et al., filed Oct. 25, 2017.
Non-Final Office Action dated Jun. 28, 2018, for U.S. Appl. No. 15/003,649, of Chen, Y., et al., filed Jan. 21, 2016.
Non-Final Office Action dated Jun. 29, 2018, for U.S. Appl. No. 15/003,580, of Chen, Y., et al., filed Jan. 21, 2016.
International Search Report and Written Opinion for International Application No. PCT/US2015/051082, dated Dec. 18, 2015.
International Search Report and Written Opinion for International Application No. PCT/US2015/051090 dated Dec. 21, 2015.
Office Action for European Patent Application No. 15 825 575.2, dated Oct. 1, 2018.
Final Office Action dated Feb. 21, 2019, for U.S. Appl. No. 15/003,649, of Chen, Y., et al., filed Jan. 21, 2016.
Non-Final Office Action dated Feb. 26, 2019, for U.S. Appl. No. 16/051,381, of Chen, Y., et al., filed Jul. 31, 2018.
Summons to Oral Proceeding for European Patent Application No. 15825575.2, dated Mar. 6, 2019.
Non-Final Office Action dated Apr. 2, 2019, for U.S. Appl. No. 15/003,580, of Chen, Y., et al., filed Jan. 21, 2016.
Non-Final Office Action dated Sep. 5, 2019, for U.S. Appl. No. 16/051,381, of Chen, Y., et al., filed Jul. 31, 2018.

\* cited by examiner

POINT OF SALE SYSTEM WITH SECURE AND UNSECURE MODES

CROSS-REFERENCE TO RELATED APPLICATIONS

This application claims the benefit of U.S. Provisional Application No. 62/027,855, filed Jul. 23, 2014, which application is hereby incorporated by reference in its entirety.

BACKGROUND

Many computing systems and devices now typically include some form of display. Displays are becoming more common for various reasons, such as decreasing manufacturing costs due to advancing technologies and increasing functionalities. For example, displays can act as input and output devices (e.g., touch sensitive displays) and can also show varying types of media with ease (e.g., high-definition videos and images).

Touch sensitive displays are increasingly used in computing systems and devices that involve some user interaction. Unlike typical input devices, such as keypads or pointing devices, touch sensitive displays can accommodate a wider range of inputs, such as keyboard entries and gestures. Touch sensitive displays can, therefore, facilitate greater user interactions between the users and the computing systems since there is less restriction on the types of user inputs that can be received by the system.

Certain displays can operate to show and/or receive data of varying degrees of security. For example, a point of sale system can receive authentication information from a user, via a touch sensitive device, to complete a payment transaction while also engaging the user for other purposes, such as marketing campaigns. However, data involved in payment transactions needs to comply with industry security protocols and can require increased data processing by the point of sale system that can cause delays in the operation of the point of sale system as a whole.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

The various embodiments described herein generally relate to a user interface system operable to provide secured and unsecured modes for handling data. Some of the described embodiments can be directed to receiving secured and unsecured touch input. The user interface system can include a touch sensitive computing device in one embodiment. In some described embodiments, the user interface system can be for providing secured and unsecured outputs. Some other embodiments of the user interface system may involve receiving secured and unsecured touch input as well as providing secured and unsecured outputs.

Data being provided or received at a computing system such as a user interface system typically cannot be easily distinguished based on security levels and/or requirements. Secured data generally needs to comply with certain industry security protocols and thus, the processing of such secured data can consume a substantial portion of the processing resources available at the computing system. However, unsecured data does not need to comply with any industry security protocols and processing the unsecured data in the same manner as the secured data can impair the operation of the computing system as a whole.

For example, touch sensitive computing devices with touch sensitive displays can generally facilitate greater user interactions between the users and the respective computing system than most typical input devices, such as keypads or pointing devices. Touch sensitive displays can accommodate a wider range of inputs, such as keyboard entries and gestures and so, the design of the user interfaces for the touch sensitive computing device are less restricted by the types of inputs that can be used.

Points of sale systems, for example, that incorporate a user interface system can receive authentication information from a user to complete a payment transaction and can also engage the user for other purposes, such as marketing campaigns offered by the merchant. The data involved in payment transactions, however, needs to comply with industry security protocols, which can consume a substantial portion of the processing resources at the point of sale system. Processing of both the transaction data and unsecured data in the same manner is likely to impair the operation of the point of sale system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Figure 1:
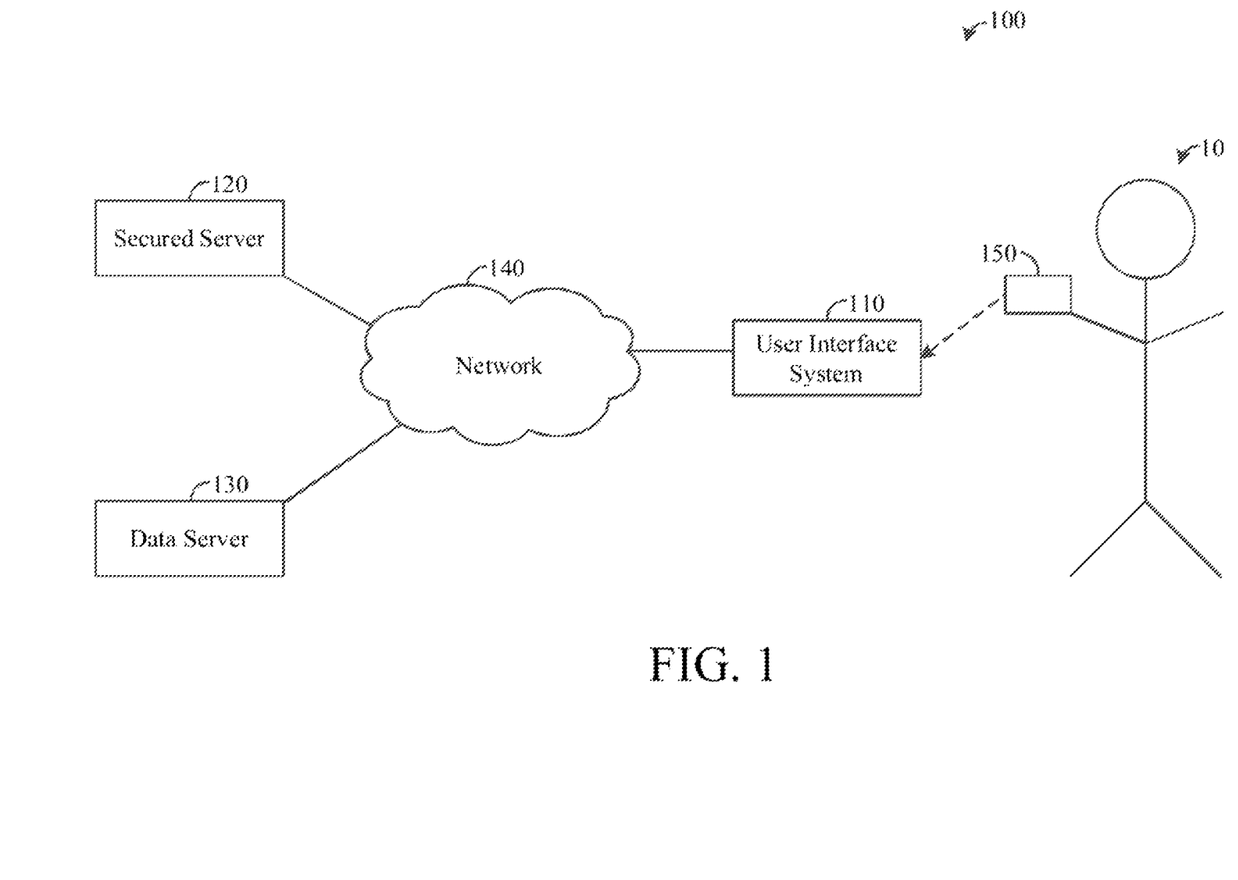
FIG. 1 is a block diagram of an embodiment of components interacting with a user interface system.

Reference is first made to FIG. 1, which illustrates a block diagram 100 of a user 10 and components interacting with a user interface system 110.

The user interface system 110 can be in electronic communication with a secured server 120 and a data server 130 via a network 140. The user interface system 110 can also receive input, directly or indirectly, from the user 10. For example, the user interface system 110 can receive input indirectly from the user 10 via a payment card 150 or a computing device.

The secured server 120 can operate generally with secured data while the data server 130 can operate generally with other data. Each of the secured server 120 and the data server 130 may include one or more processors with computing processing abilities and memory such as a database(s) or file system(s).

For example, when the user interface system 110 operates to receive data, the secured server 120 can operate based generally on secured data provided from the user interface system 110, and the data server 130 can operate based on other data provided from the user interface system 110. When the user interface system 110 operates to provide data, the secured server 120 can operate to provide secured data while the data server 130 can operate to provide the other data to the user interface system 110.

It will be understood that, although only one secured server 120 and one data server 130 are shown in FIG. 1, each of the secured server 120 and the data server 130 may include one or more servers that may be distributed over a wide geographic area and connected via the network 140. It is also possible for the secured server 120 and the data server 130 to be provided as one server, and for the secured server 120 to be separated by data encryption or security.

The network 140 can generally be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these, capable of interfacing with, and enabling communication between, the user interface system 110, the secured server 120 and the data server 130.

In some embodiments, different networks can be provided for each of the secured server 120 and the data server 130. A secured network may be provided to facilitate electronic communication between the user interface system 110 and the secured server 120. For example, when the user interface system 110 operates as a point-of-sale system, the secured server 120 can be a payment processing gateway for authorizing payment transactions initiated at the point-of-sale system and the data server 130 can be a merchant server for facilitating other operations available via the point-of-sale system, such as marketing campaigns or loyalty programs offered by the merchant. The secured network between the payment processing gateway (secured server) 120 and the point-of-sale system (user interface system) 110 can therefore be provided to enable secured and encrypted data transfer, whereas another network can be used to provide data transfer between the merchant server (data server) 130 and the point-of-sale system (user interface system) 110.

The user interface system 110 can include any computing device with a display or operable with a display. The display may be a touch sensitive display in some embodiments. The computing device can also be operable to connect to the network 140. The computing device may couple to the network 140 through a wired or wireless connection. Example computing devices may include at least a processor and memory. In one embodiment, the computing device may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

Figure 2A:
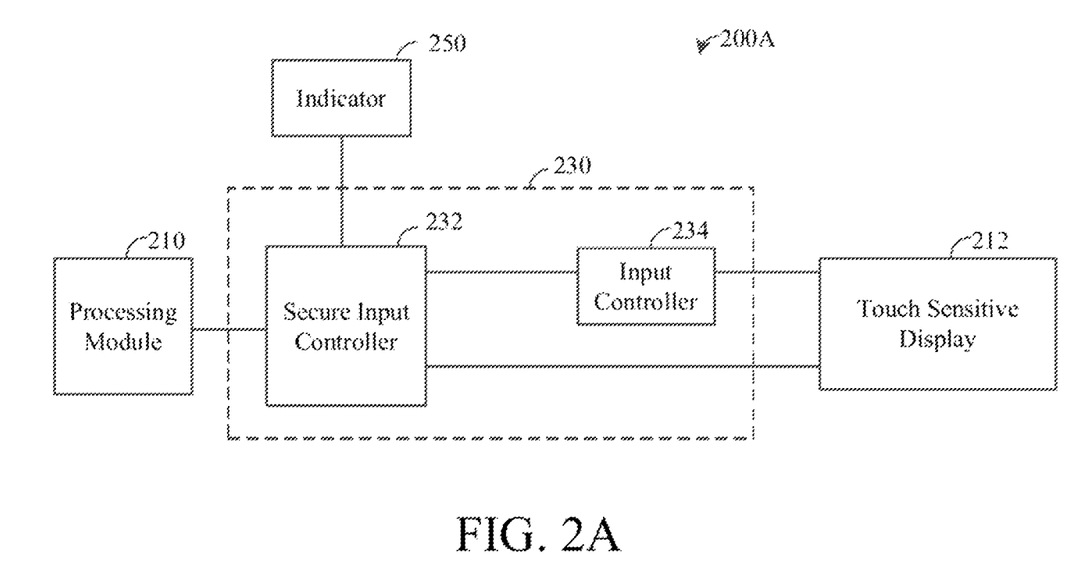
FIGS. 2A-2C are block diagrams of embodiments of the user interface system of FIG. 1.

Reference will be made to FIG. 2A, which is a block diagram 200A of an embodiment of the user interface system 110. The user interface system 110 in this embodiment can operate as a touch sensitive system and as shown in FIG. 2A, the touch sensitive system 200A can include a touch sensitive display 212, a processing module 210, and an interface module 230.

The interface module 230 can include a secure input controller 232 and an input controller 234. As shown in FIG. 2A, the input controller 234 can be operatively coupled to the touch sensitive display 212, and the secure input controller 232 can be operatively coupled to the touch sensitive display 212 and the input controller 234. Input controllers 232, 234 may receive the input data from the touch sensitive display 212 via touch electrodes.

Each of the input controller 234 and the secure input controller 232 can receive input data provided via the touch sensitive display 212, and interpret the touch input accordingly.

The secure input controller 232 can be dedicated to receiving and interpreting touch input that requires compliance with certain security protocols. The secure input controller 232 can receive secured input directly from the touch sensitive display 212, or indirectly via the input controller 234. Compliance with security protocols can involve various control measures that require substantial processing power, such as maintenance of a firewall, regular updates of anti-virus software applications, restriction to access, application of various encryption protocols, etc. The secure input controller 232, therefore, is likely to operate slower than the input controller 234, which is not limited by the security protocols.

In some embodiments, the touch sensitive display 212 can include a secured display portion for receiving only secured touch input. Any data received at the secured display portion will be processed by the secure input controller 232.

The secure input controller 232 can, in some embodiments, operate in conjunction with the input controller 234. The input controller 234 can receive touch input from all regions of the touch sensitive display 212 or, if there is a secured display portion, the input controller 234 can receive touch input from regions of the touch sensitive display 212 apart from the secured display portion. The secure input controller 232 can then receive data based on the touch input provided from the input controller 234. Based on the data provided by the input controller 234, the secure input controller 232 can identify the secured touch input and prevent the secured touch input from being provided to the processing module 210.

With the input controller 234 and the secure input controller 232, the touch sensitive system 200A may, therefore, engage in different modes of operations, such as a non-secure input mode and a secure input mode. In some embodiments, the touch sensitive system 200A can be engaged in the secure input mode in response to a signal received from a software application stored at the touch sensitive system 200A or a signal received from the secured server 120.

During the non-secure input mode, the touch sensitive system 200A can receive input at the touch sensitive display 212 that is not limited by security protocols and can be provided directly to the processing module 210. The touch sensitive system 200A can couple the input controller 234 to the processing module 210 for communicating the received touch input to the processing module 210. In some embodiments, the input controller 234 can be coupled to the processing module 210 via the secure input controller 232. The input controller 234 may be coupled to the secure input controller 232 via an Inter-Integrated Circuit (I2C) connection. Similarly, the secure input controller 232 may be coupled to the processing module 210 via an I2C connection.

During the secure input mode, the touch sensitive system 200A can receive input at the touch sensitive display 212 that needs to comply with security protocols. As described, the secure input controller 232 can receive the secured touch input directly from the touch sensitive display 212 (e.g., via a secured display portion) and/or indirectly via the input controller 234.

After receiving the touch data from the touch sensitive display 212 and/or the input controller 234, the secure input controller 232 can block at least some of the touch inputs received at the touch sensitive display 212 from being provided to the processing module 210. By blocking at least some of the touch inputs from being communicated to the processing module 210, the secure input controller 232 can control the type of data that is provided to the processing module 210. For example, data such as authentication information are not provided to the processing module 210.

In some embodiments, the touch sensitive system 200A can activate an indicator 250 to visually show that the secure input mode is engaged. The indicator 250 can be operatively coupled to the secure input controller 232 so that when the secure input controller 232 is engaged in the secure input mode, the secure input controller 232 can also activate the indicator 250. The indicator 250 may be a LED or other visual indicator provided at the touch sensitive system 200A.

Figure 2B:
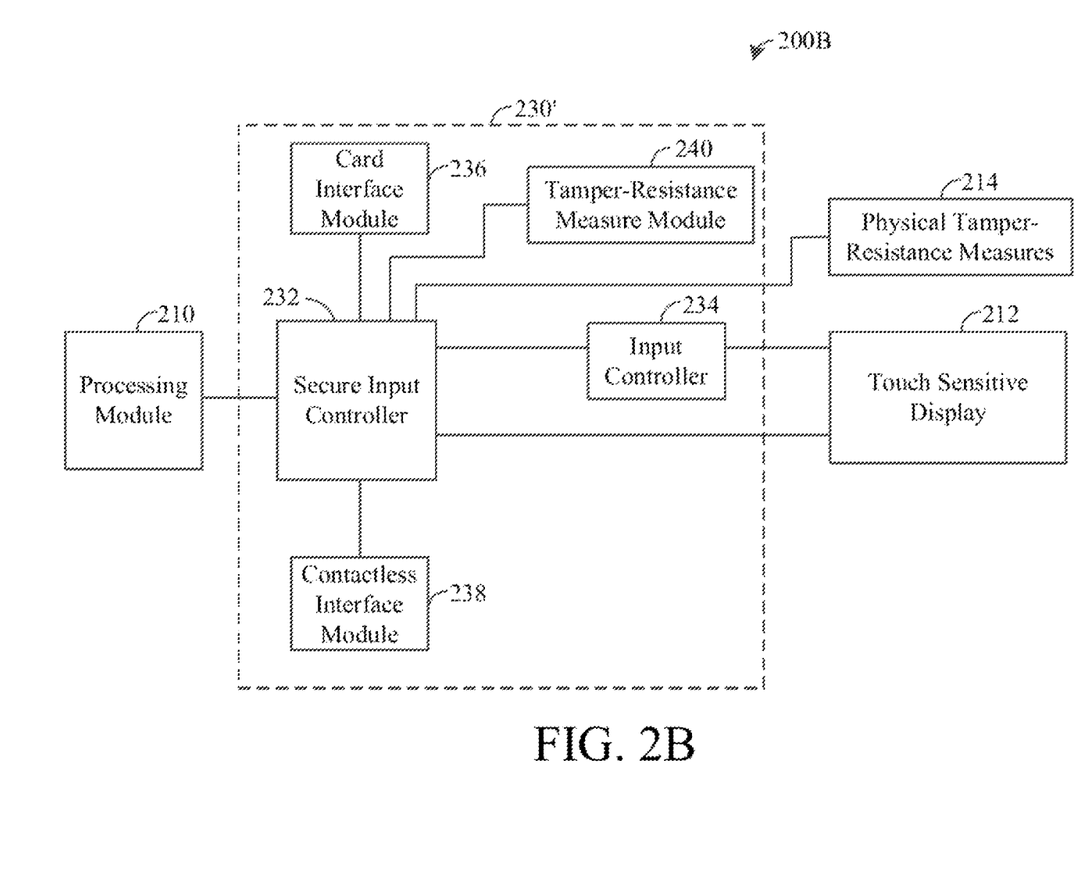

Reference will now be made to FIG. 2B. FIG. 2B is a block diagram 200B of another embodiment of the user interface system 110. In the block diagram 200B, the user interface system 110 is provided as a point-of-sale system.

Similar to the touch sensitive system 200A shown in FIG. 2A, the point-of-sale system 200B includes the processing module 210, the touch sensitive display 212 and an interface module 230'.

The interface module 230' of the point-of-sale system 200B, like the interface module 230 of FIG. 2A, includes a secure input controller 232 and an input controller 234. During the secure input mode, the secure input controller 232 in this example needs to comply with industry security requirements, such as the Payment Card Industry Data Security Standards (PCI DSS).

The interface module 230' also includes a card interface module 236, a contactless interface module 238 and a tamper-resistance measure module 240.

The card interface module 236 and the contactless interface module 238 operate to receive and process data from the payment card 150 or other compatible computing devices. Each of the card interface module 236 and the contactless interface module 238 can be operatively coupled to the secure input controller 232, as shown in FIG. 2B, to encrypt data received from the payment card 150 or other compatible computing devices. Briefly, as shown in FIG. 3B, an example point-of-sale system 200B can include various card interfaces, such as a chip reader 336a and a magnetic strip reader 336b, for receiving card data that is to be processed by the card interface module 236. A contactless reader 338 is also illustrated in FIG. 3B for receiving data to be processed by the contactless interface module 238.

Referring still to FIG. 2B, the tamper-resistance measure module 240 can be operatively coupled to the secure input controller 232. The tamper-resistance measure module 240 can operate with the secure input controller 232 to engage one or more different tamper resistance components provided in the physical tamper-resistance measures 214 at the point-of-sale system 200B, or to receive tamper signals from the physical tamper-resistance measures 214 indicating there was an attempt at modifying the point-of-sale system 200B. The physical tamper-resistance measures 214 generally prevent counterfeiters from modifying the point-of-sale system 200B or otherwise accessing the interface module 230' for obtaining the secured data. The physical tamper-resistance measures 214 can include components, such as a mesh or switches, that can detect any attempt at physical disassembly or modification of the point-of-sale system 200B.

Figure 2C:
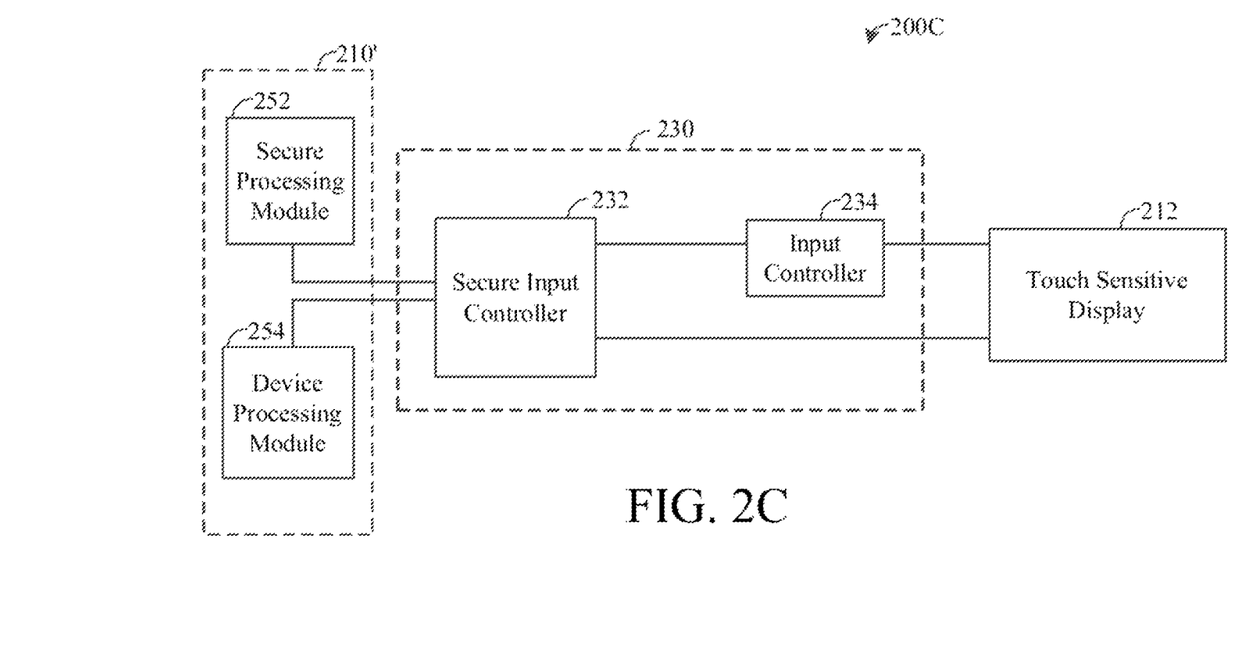

Another embodiment of the user interface system 110 will now be described with reference to FIG. 2C. FIG. 2C is yet another block diagram 200C of the user interface system 110 in accordance with yet another example embodiment. In the block diagram 200C, the user interface system 110 may be provided as a display system.

Similar to the touch sensitive system 200A of FIG. 2A and the point-of-sale system 200B of FIG. 2B, the display system 200C includes a processing module 210', the touch sensitive display 212 and an interface module 230. It will be understood that the interface module 230' may similarly be provided as part of the display system 200C in some other embodiments.

The processing module 210' of the display system 200C includes a secure processing module 252 and a device processing module 254. The secure processing module 252, like the secure input controller 232, can include processing components that are configured to comply with security protocols. As a result, the secure processing module 252 may operate slower than the device processing module 254. The device processing module 254 can be native to the computing device(s) providing the display system 200C.

Similar to the touch sensitive system 200A and the point-of-sale system 200B, when operating in the secure input mode, the display system 200C can receive input at the touch sensitive display 212 that needs to comply with security protocols. The secure input controller 232 can receive the secured touch input and initiate operation by the secure processing module 252.

During the non-secure input mode, the display system 200C can receive input at the touch sensitive display 212 that is not limited by security protocols and can be provided directly to the device processing module 254.

An example operation of the point-of-sale system 200B will now be described with reference to FIGS. 3A to 4B. FIGS. 3A to 4B illustrate an example point-of-sale system 300.

The point-of-sale system 300 includes a touch sensitive display 312, a chip reader 336a, a magnetic strip reader 336b, and a contactless reader 338. It will be understood that the point-of-sale system 300 illustrated in FIGS. 3A to 4B is merely an example and other configurations and designs are possible.

Figure 3A:
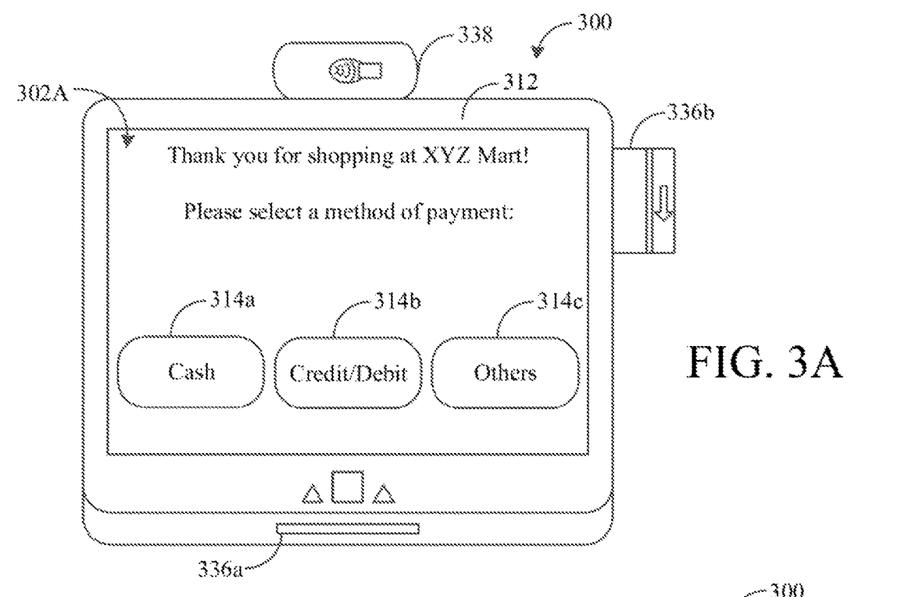
FIGS. 3A and 3B illustrate an embodiment of a touch sensitive computing device in operation.
Figure 3B:
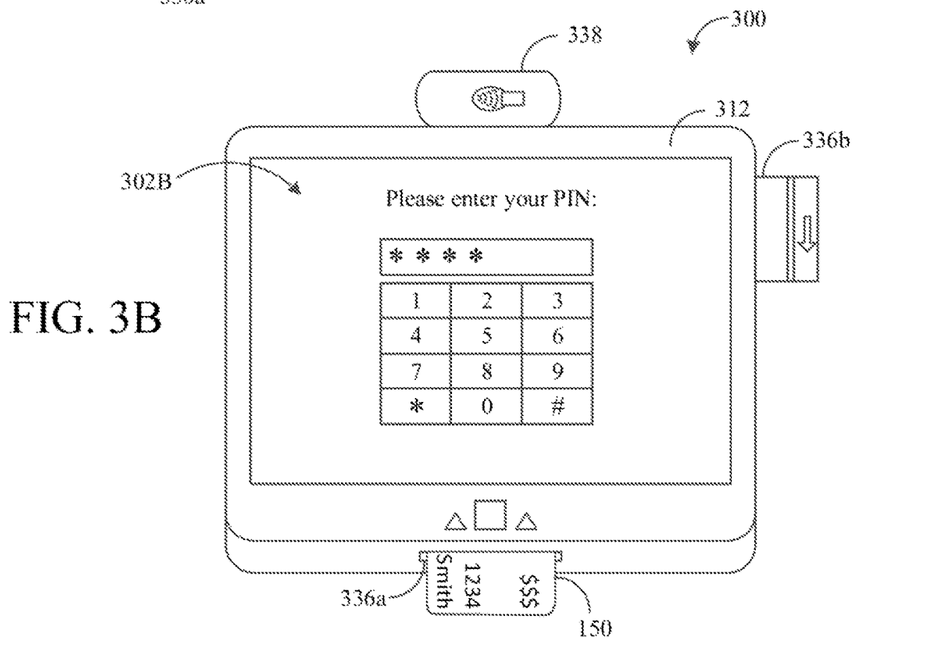

FIGS. 3A and 3B illustrate user interfaces 302A and 302B, respectively, for facilitating a payment transaction at the point-of-sale system 300. In FIG. 3A, the user interface 302A includes control buttons 314a to 314c for receiving a touch input for selecting a form of payment. The point-of-sale system 300 can continue to operate in the non-secured mode since the touch input being received is not secured data information.

In response to a selection of the form of payment or detection of an insertion of the payment card 150 at the chip reader 336a, the point-of-sale system 300 can be engaged in the secured mode since the touch input being received is authentication information that needs to comply with the payment security protocols. The point-of-sale system 300 may similarly be engaged in the secured mode in response to a signal received from the payment processing gateway 120. As shown in FIG. 3B, the user interface 302B provides a keypad for receiving a personal identification number (PIN) from the user. The PIN is then provided to the secure input controller 232 to complete the payment transaction. While the keypad is shown on the touch sensitive display 312, an indicator (not shown in FIG. 3B) at the point-of-sale system 300 may be activated to indicate that the secured mode has been engaged.

Figure 4A:
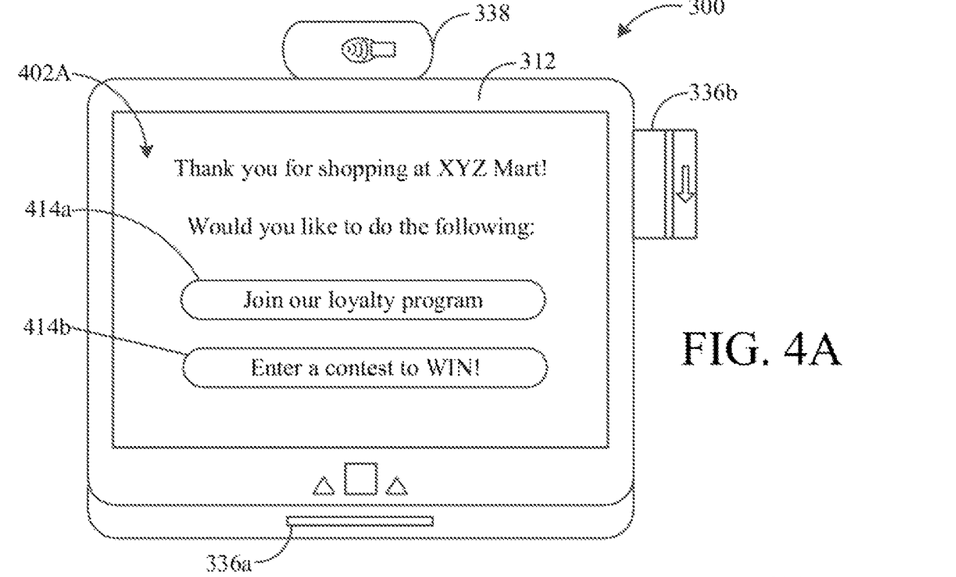
FIGS. 4A and 4B illustrate an embodiment of the touch sensitive computing device of FIGS. 3A and 3B in another operation.
Figure 4B:
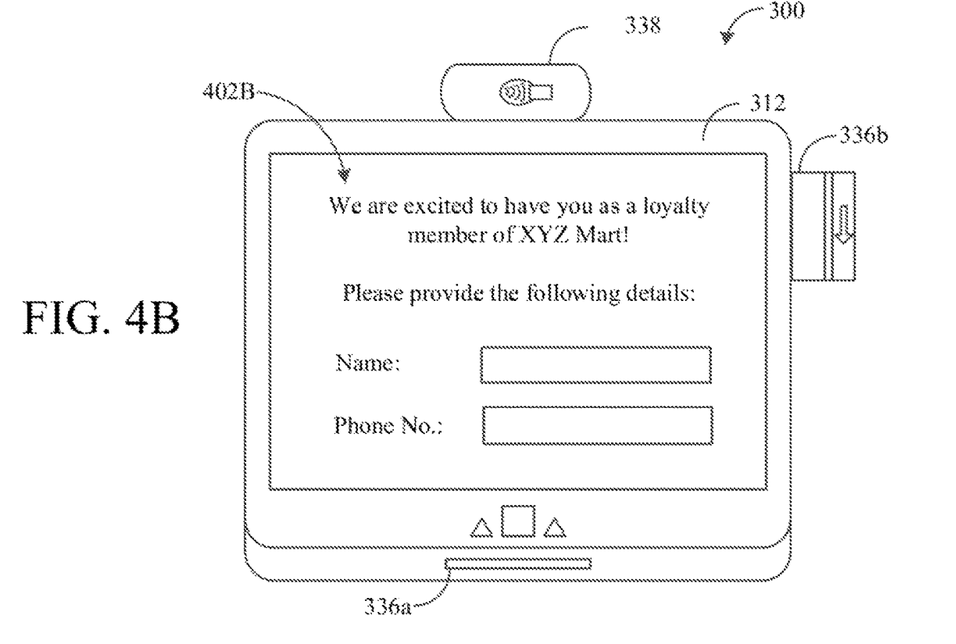

Continuing with reference to FIGS. 4A and 4B, which illustrate user interfaces 402A and 402B, respectively, for facilitating other user interactions at the point-of-sale system 300. In FIG. 4A, the user interface 402A includes control buttons 414a and 414b for receiving a touch input for selecting a type of interaction, such as to join a loyalty program or to enter a contest. In the example of FIGS. 4A and 4B, the control button 414a was selected and the loyalty membership interface 402B of FIG. 4B is then shown. The point-of-sale system 300 can operate in the non-secured mode for both FIGS. 4A and 4B since the touch input received at user interfaces 402A and 402B does not need to comply with any industry security protocol. Inputs received via the loyalty membership interface 402B can be provided to the input controller 234 and eventually provided to the data server 130.

In the example of FIGS. 4A and 4B, the input controller 234 can continue to facilitate the user interactions at the point-of-sale system 300. Unlike operations involving the secure input controller 232, the user interactions shown in FIGS. 4A and 4B do not need to comply with any industry security protocols and therefore, unaffected by any compliance requirements.

Figure 5:
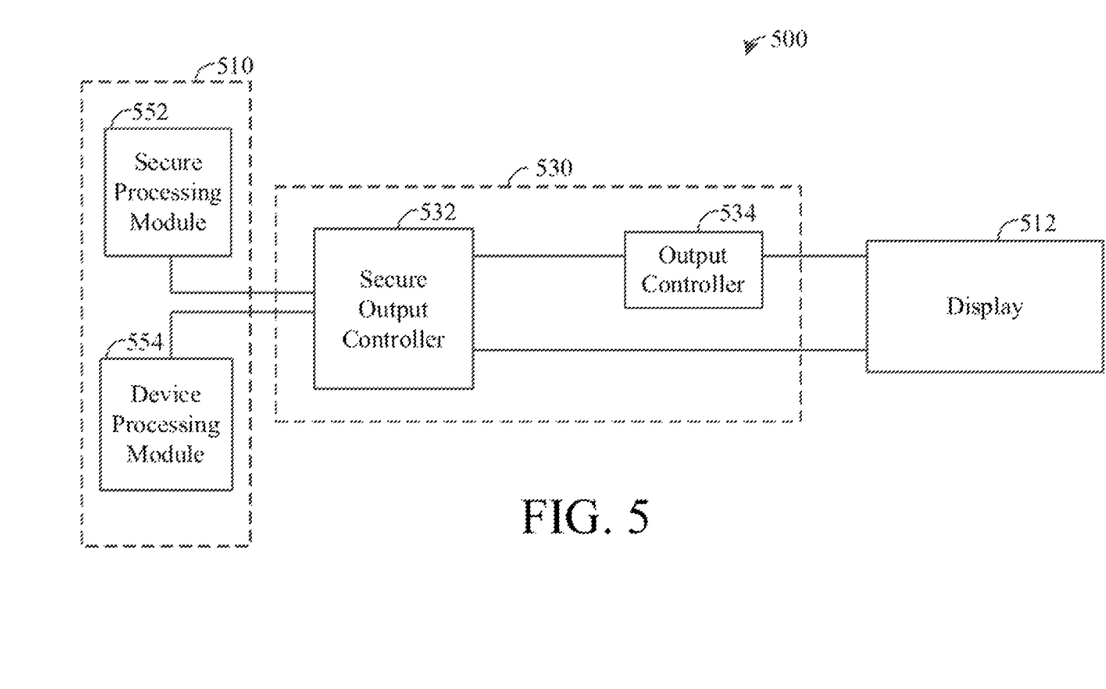
FIG. 5 is a block diagram of a further embodiment of the user interface system of FIG. 1.

Referring now to FIG. 5, which is a block diagram 500 of another embodiment of the user interface system 110 of FIG. 1.

The embodiment shown in the block diagram 500 can operate as a display system. The display system 500 includes a display 512, a processing module 510 and an interface module 530. The processing module 510 includes a secure processing module 552 and a device processing module 554. The interface module 530 includes a secure output controller 532 and an output controller 534.

Unlike the systems 200A to 200C, the display system 500 does not include a touch sensitive display 212. Instead, the display 512 can operate to show various data information.

As shown in FIG. 5, the processing module 510 is operatively coupled to the display 512 via the interface module 530. Depending on the operational mode, one of the secure processing module 552 and the device processing module 554 can be coupled to the display 512 via the interface module 530. As noted, the secure processing module 552, like the secure output controller 532, can include processing components that are configured to comply with security protocols. As a result, the secure processing module 552 may operate slower than the device processing module 554. The secure processing module 552, therefore, should operate only to facilitate compliance with security protocols in order to avoid impairing the display system 500 unnecessarily.

During a secure output mode, for example, the secure output controller 532 can detect that the data to be provided to the display 512 requires compliance with certain security protocols. Accordingly, the secure output controller 532 can couple the secure processing module 552 with the display 512 to facilitate control of the display 512 by the secure processing module 552. On the other hand, during a non-secure output mode, the secure output controller 532 can couple the device processing module 554 with the display 512 so that the device processing module 554 controls the display 512. An example will now be described with reference to FIGS. 6A and 6B.

Figure 6A:
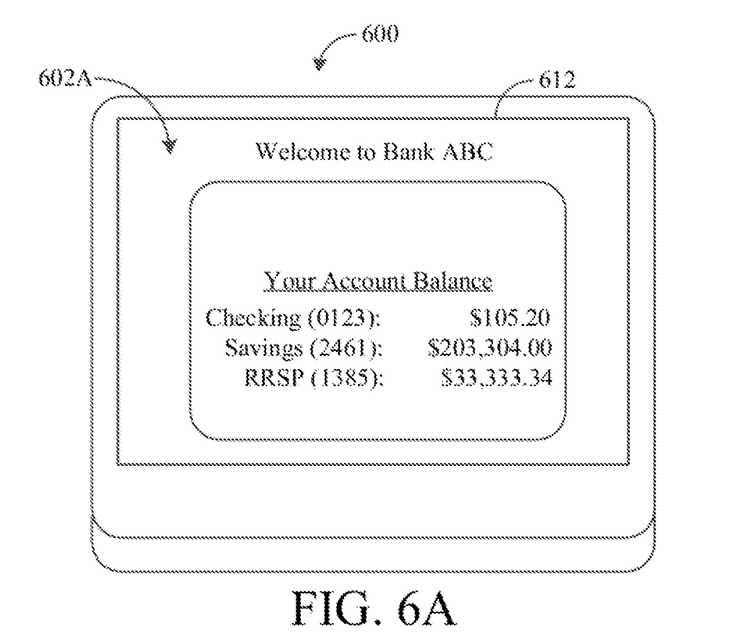
FIG. 6A illustrates an embodiment of a computing device in operation.
Figure 6B:
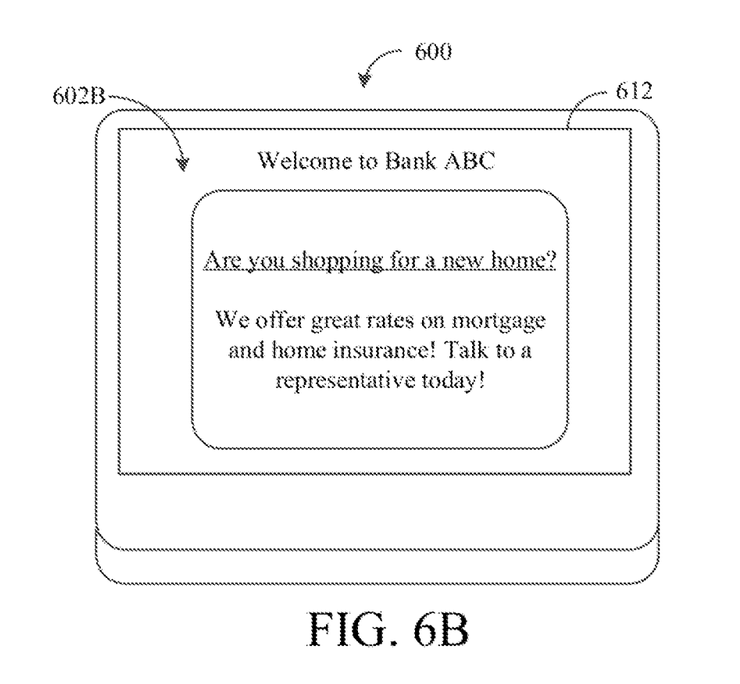
FIG. 6B illustrates an embodiment of the computing device of FIG. 6A in another operation.

FIGS. 6A and 6B illustrate a computing device 600 having a display 612. The computing device 600 in this example is used at a bank to display data to a customer. For instance, the computing device 600 may be provided at a teller counter to provide various data to a customer being serviced by the teller. The data provided to the computing device 600 can range in varying levels of security, such as personal banking information and marketing campaigns developed by the bank.

FIG. 6A illustrates the computing device 600 operating in a secure mode. As shown on the display 612, a user interface 602A provides bank account balances. To control operation of the display 612 for providing the bank account data, the secure output controller 532 can couple the secure processing module 552 to the display 612.

FIG. 6B illustrates the computing device 600 operating in a non-secured mode. A user interface 602B provides information regarding mortgages and home insurance that are part of a marketing campaign offered by the bank.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

What is claimed is:

1. A point of sale system to facilitate a payment transaction by a user, the point of sale system comprising:
   a touch sensitive display including touch electrodes configured to receive a plurality of touch inputs from a user, the touch sensitive display displaying at least one control button during the payment transaction, wherein a selection of the displayed at least one control button by the user is one of the plurality of received touch inputs at the touch sensitive display and input data is another of the plurality of received touch inputs at touch sensitive display;
   a chip reader to receive chip card data;
   a contactless reader to receive contactless data;
   an input controller coupled to the touch sensitive display; and
   a secure input controller separately coupled to both the input controller and the touch sensitive display to receive the plurality of received touch inputs from one of the input controller or the touch sensitive display, the secure input controller coupled to receive the chip card data from the chip reader and the contactless data from the contactless reader, the secure input controller configured to operate in a secure input mode to receive the input data directly from the touch sensitive display, the secure input controller operates in the secure input mode in response to the control button selection or receipt of one of the chip card data or the contactless data, the secure input controller configured to operate in a non-secure input mode to receive the input data from the input controller when the control button is not selected and the chip card data or the contactless data is not received, the secure input controller coupled to output the input data via a first connection for non-secure processing in the non-secure input mode and to output the input data via a second connection for secure processing when in the secure input mode.

2. The point of sale system of claim 1, wherein the control button indicates a form of payment.

3. The point of sale system of claim 1, further comprising a tamper resistance component that outputs a tamper signal in response to an attempt to modify the point of sale system, the tamper resistance component comprising at least one of a mesh or switches, the secure input controller coupled to receive the tamper signal from the tamper-resistance measure module.

4. The point of sale system of claim 1, wherein the touch sensitive display displays a keypad and receives a personal identification number (PIN) touch input at the keypad, and the secure input controller receives the PIN when the secure input controller is operating in the secure input mode.

5. The point of sale system of claim 1, wherein the secure input controller identifies secure touch input data within the input data, and the secure input controller operates in the secure input mode in response to identification of the secure touch input data.

6. The point of sale system of claim 1, wherein the touch sensitive display comprises a secure display portion, and the secure input controller operates in the secure input mode when one of the received touch inputs is received from the secure display portion.

7. The point of sale system of claim 1, further comprising an indicator, wherein the secure input controller causes the indicator to activate when in the secure input mode.

8. The point of sale system of claim 1, wherein the chip card data and the contactless data are encrypted when in the secure input mode.

9. The point of sale system of claim 1, further comprising a magnetic strip reader to receive magnetic strip data, the secure input controller coupled to receive the magnetic strip data from the magnetic strip reader, and the secure input controller configured to operate in the secure input mode in response to receipt of the magnetic strip data.

* * * * *